United States Patent
Noguchi et al.

(10) Patent No.: US 10,423,536 B2
(45) Date of Patent: Sep. 24, 2019

(54) MEMORY SYSTEM WITH PLURAL NONVOLATILE MEMORIES HAVING DIFFERENT ACCESS SIZES, DIFFERENT SPEEDS USING ADDRESS CONVERSION INFORMATION TO ACCESS ONE MEMORY BY CONVERTING AN ADDRESS TO ACCESS ANOTHER MEMORY

(71) Applicant: TOSHIBA MEMORY CORPORATION, Tokyo (JP)

(72) Inventors: Hiroki Noguchi, Kanagawa (JP); Shinobu Fujita, Tokyo (JP)

(73) Assignee: TOSHIBA MEMORY CORPORATION, Minato-ku (JP)

(*) Notice: Subject to any disclaimer, the term of this patent is extended or adjusted under 35 U.S.C. 154(b) by 1 day.

(21) Appl. No.: 15/455,483

(22) Filed: Mar. 10, 2017

(65) Prior Publication Data
US 2018/0081820 A1 Mar. 22, 2018

(30) Foreign Application Priority Data
Sep. 20, 2016 (JP) .................................. 2016-183344

(51) Int. Cl.
G06F 12/02 (2006.01)
G06F 12/10 (2016.01)
G06F 12/0811 (2016.01)
G06F 12/0868 (2016.01)
G06F 12/0897 (2016.01)

(52) U.S. Cl.
CPC .......... *G06F 12/10* (2013.01); *G06F 12/0238* (2013.01); *G06F 12/0868* (2013.01); *G06F 12/0897* (2013.01); *G06F 12/0811* (2013.01); *G06F 2212/1016* (2013.01); *G06F 2212/214* (2013.01); *G06F 2212/313* (2013.01); *G06F 2212/7201* (2013.01); *G06F 2212/7203* (2013.01); *G06F 2212/7207* (2013.01)

(58) Field of Classification Search
None
See application file for complete search history.

(56) References Cited

U.S. PATENT DOCUMENTS

| | | | |
|---|---|---|---|
| 8,654,563 | B2 | 2/2014 | Confalonieri et al. |
| 2003/0154345 | A1* | 8/2003 | Lyon ................. G06F 12/0897 711/122 |
| 2013/0028028 | A1 | 1/2013 | Matsunami |
| 2013/0138894 | A1* | 5/2013 | Loh ..................... G06F 12/0888 711/144 |
| 2016/0196210 | A1 | 7/2016 | Noguchi et al. |
| 2017/0123980 | A1* | 5/2017 | Willhalm ........... G06F 12/0811 |

FOREIGN PATENT DOCUMENTS

JP 2013-30552 2/2013
JP 2015-60571 3/2015

* cited by examiner

*Primary Examiner* — Jared I Rutz
*Assistant Examiner* — Marwan Ayash
(74) *Attorney, Agent, or Firm* — Oblon, McClelland, Maier & Neustadt, L.L.P.

(57) ABSTRACT

A memory system has a first memory to be accessed per first data size, a second memory to be accessed per second data size smaller than the first data size, the second memory being accessible at a higher speed than the first memory; and a third memory to store address conversion information that converts an address for accessing the second memory into an address for accessing the first memory. The first and third memories are non-volatile memories.

21 Claims, 7 Drawing Sheets

MEMORY SYSTEM WITH PLURAL NONVOLATILE MEMORIES HAVING DIFFERENT ACCESS SIZES, DIFFERENT SPEEDS USING ADDRESS CONVERSION INFORMATION TO ACCESS ONE MEMORY BY CONVERTING AN ADDRESS TO ACCESS ANOTHER MEMORY

CROSS REFERENCE TO RELATED APPLICATIONS

This application is based upon and claims the benefit of priority from the prior Japanese Patent Application No. 2016-183344, filed on Sep. 20, 2016, the entire contents of which are incorporated herein by reference.

FIELD

Embodiments relate to a memory system and a processor system.

BACKGROUND

As a main memory of a processor, conventionally, a DRAM (Dynamic Random Access Memory) has been used. However, the DRAM requires to be refreshed periodically, and hence power consumption increases. Therefore, there is a proposed technique to use a large-capacity non-volatile memory as the main memory, instead of the DRAM.

However, it is not so rare for the non-volatile memory to have a lower write speed and lower rewrite durability than the DRAM.

DETAILED DESCRIPTION

According to one embodiment, a memory system has a first memory to be accessed per first data size, a second memory to be accessed per second data size smaller than the first data size, the second memory being accessible at a higher speed than the first memory, and a third memory to store address conversion information that converts an address for accessing the second memory into an address for accessing the first memory, wherein the first and third memories are non-volatile memories.

Embodiments will now be explained with reference to the accompanying drawings.

First Embodiment

Figure 1:
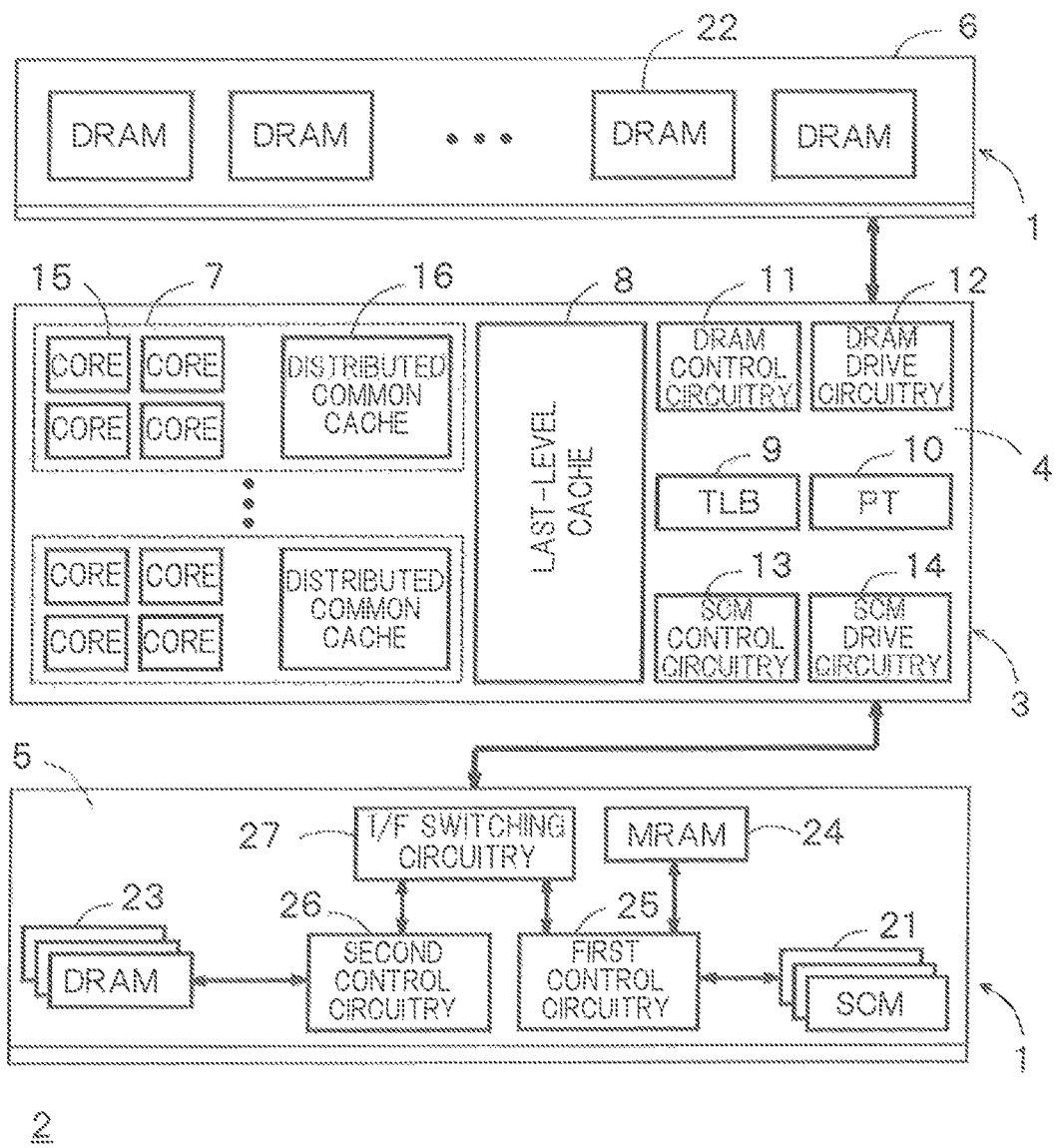
FIG. 1 is a block diagram schematically showing the configuration of a processor system according to a first embodiment.

FIG. 1 is a block diagram schematically showing the configuration of a processor system 2 having a memory system 1 according to a first embodiment. The processor system 2 of FIG. 1 is provided with a first substrate 4 having a processor 3, and a second substrate 5 and a third substrate 6, which are included in the memory system 1.

The first substrate 4 may include one or a plurality of semiconductor chips. The processor 3 has a plurality of multicore units 7, a last-level cache 8, a TLB (Translation Lookaside Buffer) 9, a page table (PT) 10, DRAM control circuitry 11, DRAM drive circuitry 12, SCM control circuitry 13, and SCM drive circuitry 14. Although the processor 3 is provided with several types of circuit blocks other than those shown in FIG. 1, the circuit blocks are omitted in FIG. 1.

Each multicore unit 7 has a plurality of cores 15 and a distributed common cache 16 shared by the cores 15. Although omitted in FIG. 1, each core 15 has an individual cache (for example, L1-cache) of at least one level, built therein. The distributed common cache 16 is a cache memory (for example, L2-cache) to be accessed by the cores 15 in the associated multicore unit 7.

The last-level cache 8 is a cache memory having the lowest access priority among hierarchical cache memories. The last-level cache 8 is accessed by the multicore units 7.

When an address that the processor 3 has made an access request, does not hit the last-level cache 8, the processor 3 accesses the second substrate 5 mounting an SCM (Storage Class Memory, first memory) 21 or the third substrate 6 mounting a fourth memory (for example, DRAM) 22. The SCM 21 and the fourth memory 22 are memories of the same level, which are a so-called main memory. The processor 3 allocates the SCM 21 and the fourth memory 22 in a first address space and in a different second address space, respectively, on a main memory map. An example explained in the following is the case where the fourth memory 22 is a DRAM.

The SCM control circuitry 13 controls access to the second substrate 5 mounting the SCM (Storage Class Memory) 21. The SCM drive circuitry 14 accesses the SCM 21 in accordance with an instruction from the SCM control circuitry 13.

The DRAM control circuitry 11 controls access to the third substrate 6 mounting the DRAM 22. The DRAM drive circuitry 12 drives the DRAM 22 in accordance with an instruction from the DRAM control circuitry 11.

It is desirable for the second substrate 5 and the third substrate 6 to have a detachable-interface function in order to increase or decrease the memory capacity, as required. For example, the third substrate 6 mounting the DRAM 22 may be a memory module that conforms with the DIMM (Dual Inline Memory Module) standard. In the same manner, the second substrate 5 may be a standardized memory module.

In the present embodiment, at least a part of memories mounted on the second substrate 5 is referred to as the SCM 21. In more specifically, the second substrate 5 has a first memory 21, a second memory 23, a third memory 24, first control circuitry 25, second control circuitry 26, and I/F switching circuitry 27. Each component on the second substrate 5 may be configured with one or a plurality of semiconductor chips.

The first memory 21 is accessed per first data size. In the present embodiment, the first data size is referred to as a segment size. The segment size may have any value. As an example, the segment size has a data size of 1000 pages each having four kilobytes. Here, the first memory 21 is a non-volatile memory. The non-volatile memory may be of any type. The first memory 21 is a large-capacity non-volatile memory and is, for example, preferably a three-dimensional cross-point non-volatile memory. As practical examples, the first memory 21 may be a phase change random access memory (PCM), a resistance random access memory (ReRAM), etc., which is referred to as an SCM in the present embodiment.

The second memory 23 is accessed per second data size that is smaller than the first data size and accessible at a higher speed than the first memory 21. The second data size is, for example, a page size. One page is, for example, four kilobytes.

In the present embodiment, the first memory 21 and the second memory 23 are allocated in different address spaces of the processor 3. In accordance with an address issued by the processor 3, it is determined which of the first memory 21 and the second memory 23 access is made to. The second memory 23 may be a volatile memory or a non-volatile memory. As an example, the second memory 23 is configured with a DRAM 22 that is accessible at a higher speed than the first memory 21. As described above, the fourth memory 22 on the third substrate 6 is also allocated in a specific address space of the processor 3. As a result, the processor 3 according the first embodiment can access any of the first memory 21, the second memory 23, and the fourth memory 22, by specifying an address.

The third memory 24 stores page address conversion information for accessing the first memory 21. The page address conversion information is information for converting a page address into a per-segment address. The first memory 21 stores data per segment, and hence is accessible by converting a page address into a per-segment address, with the page address conversion information. In this way, the address conversion information is information that converts an address for accessing the second memory 23 into an address for accessing the first memory 21.

Here, the third memory 24 is a non-volatile memory. As more practical example, the third memory 24 is a non-volatile memory that has a smaller memory capacity than the first memory 21 and that is accessible at a higher speed than the first memory 21. The non-volatile memory to be used as the third memory 24 is, for example, an MRAM. Among MRAMs, for example, an STT (Spin Transfer Torque)-MRAM is a non-volatile memory based on a TMR (Tunnel Magneto Resistance) effect using spintronics, as an operational principle. Because of its high speed accessibility, the STT-MRAM can be used as the third memory 24.

As described above, in the present embodiment, on the second substrate 5, the first memory 21 and the third memory 24 are non-volatile memories, whereas the second memory 23 is a volatile memory. As an example, in the present embodiment, the first memory 21 is the SCM 21 other than the MRAM, the second memory 23 is the DRAM 22, and the third memory 24 is the MRAM.

In accordance with an address that the processor 3 makes an access request, it is determined that access is made to which of the first memory (SCM) 21 and the second memory (DRAM) 23 both on the second substrate 5, and the fourth memory (DRAM) 22 on the third substrate 6. When accessing either the first memory (SCM) 21 or the second memory (DRAM) 23 on the second substrate 5, under control by the SCM control circuitry 13, the I/F switching circuitry 27 selects either of the first control circuitry 25 and the second control circuitry 26 and sends an access request from the processor 3 to the selected control circuitry. In response to the access request from the processor 3, the first control circuitry 25 controls access to the first memory (SCM) 21 based on the address conversion information in the third memory 24. The second control circuitry 26 controls access to the second memory (DRAM) 23 in response to the access request from the processor 3.

Figure 2:
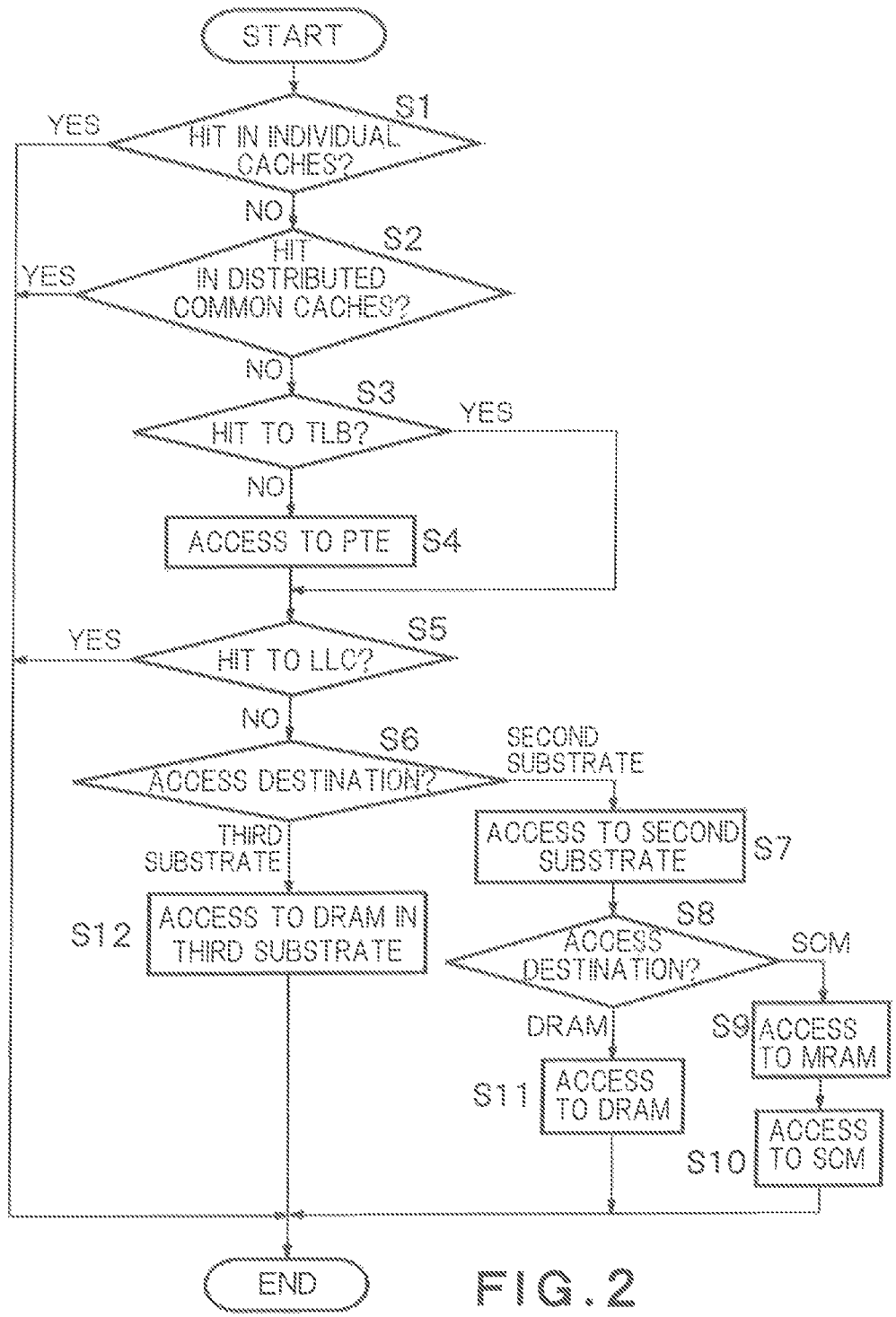
FIG. 2 is a flowchart showing an operation of the processor system according to the first embodiment.

FIG. 2 is a flowchart showing an operation of the processor system 2 according to the first embodiment. The process in the flowchart starts when the processor 3 makes an access request (write request or read request) to the memory system 1.

It is determined whether there is a hit in the individual caches of the cores 15 (step S1). If there is a hit to an individual cache, access is made to the individual cache and the process of FIG. 2 ends. If there is a miss in the individual caches, it is determined whether there is a hit in the distributed common caches 16 (step S2). If there is a hit to a distributed common cache 16, access is made to the distributed common cache 16 and the process of FIG. 2 ends. If there is a miss in the distributed common caches 16, it is determined whether there is a hit to the TLB 9 (step S3). If there is a miss to the TLB 9, access is made to an entry (PTE) of the page table 10 to acquire a page address (step S4). When there is a hit to the TLB 9 in step S3 or step S4 is complete, it is determined whether the acquired page address hits the last-level cache (LLC) 8 (step S5). If there is a hit to the last-level cache 8, access is made to the last-level cache 8 and the process of FIG. 2 ends.

If it is determined in step S5 that there is a miss to the last-level cache 8, a page address for which processor 3 has made an access request is checked to determine whether to access the second substrate 5 or the third substrate 6 (step S6).

If it is determined to access the second substrate 5, access is made to the second substrate 5 (step S7) to determine based on the page address whether to access the first memory 21 or the second memory 23 (step S8). If it is determined to access the first memory 21, the address conversion information in the third memory 24 is looked up to convert the page address into a segment address (step S9) and then, using the converted segment address, access is made to the first memory (SCM) 21 and the process of FIG. 2 ends (step S10). If it is determined in step S8 to access the second memory 23, access is made with the page address to the second memory (DRAM) 23 and the process of FIG. 2 ends (step S11).

If it is determined in step S6 to access the third substrate 6, access is made to the fourth memory (DRAM) 22 in the third substrate 6 and the process of FIG. 2 ends (step S12).

As described above, in the first embodiment, the second substrate 5 having the first memory (SCM) 21 and the second memory (DRAM) 23 mounted thereon is provided apart from the third substrate 6 having the fourth memory (DRAM) 22 mounted thereon. The processor 3 accesses the fourth memory (DRAM) 22 on the third substrate 6, and the first memory (SCM) 21 and the second memory (DRAM) 23 both on the second substrate 5, with different addresses.

On the second substrate 5, in addition to the first memory (SCM) 21, the volatile memory and the non-volatile memory, such as the second memory (DRAM) 23 and the third memory (MRAM) 24, are mounted. By using these memories, low accessibility, which is a disadvantage of the SCM 21, can be compensated. As described above, in the present embodiment, the main memory is configured with the volatile and non-volatile memories. If the main memory is configured with the volatile memories only, all data in the main memory are erased when the processor system 2 is turned off. However, in the present embodiment, since the non-volatile memories are used for part of the main memory, by storing data, which should be retained even at power-off, in the non-volatile memories, the data are not required to be loaded to the main memory when the processor system 2 is turned on again, so that the entire process of the processor system 2 can be sped up.

Moreover, in the present embodiment, access is made to the first memory (SCM) 21 per segment whereas to the second memory 23 per page, which is configured with, for example, the DRAM 22. In other words, access is made to the SCM 21, accessible at a lower speed, per data size that is larger than the page, and hence it is possible to perform high-speed access. As described above, even though the data size to be accessed is different between the first memory 21 and the second memory 23, since address conversion information is stored in the third memory 24, access can be made to the first memory 21 and the second memory 23 with no particular problems.

Second Embodiment

Figure 3:
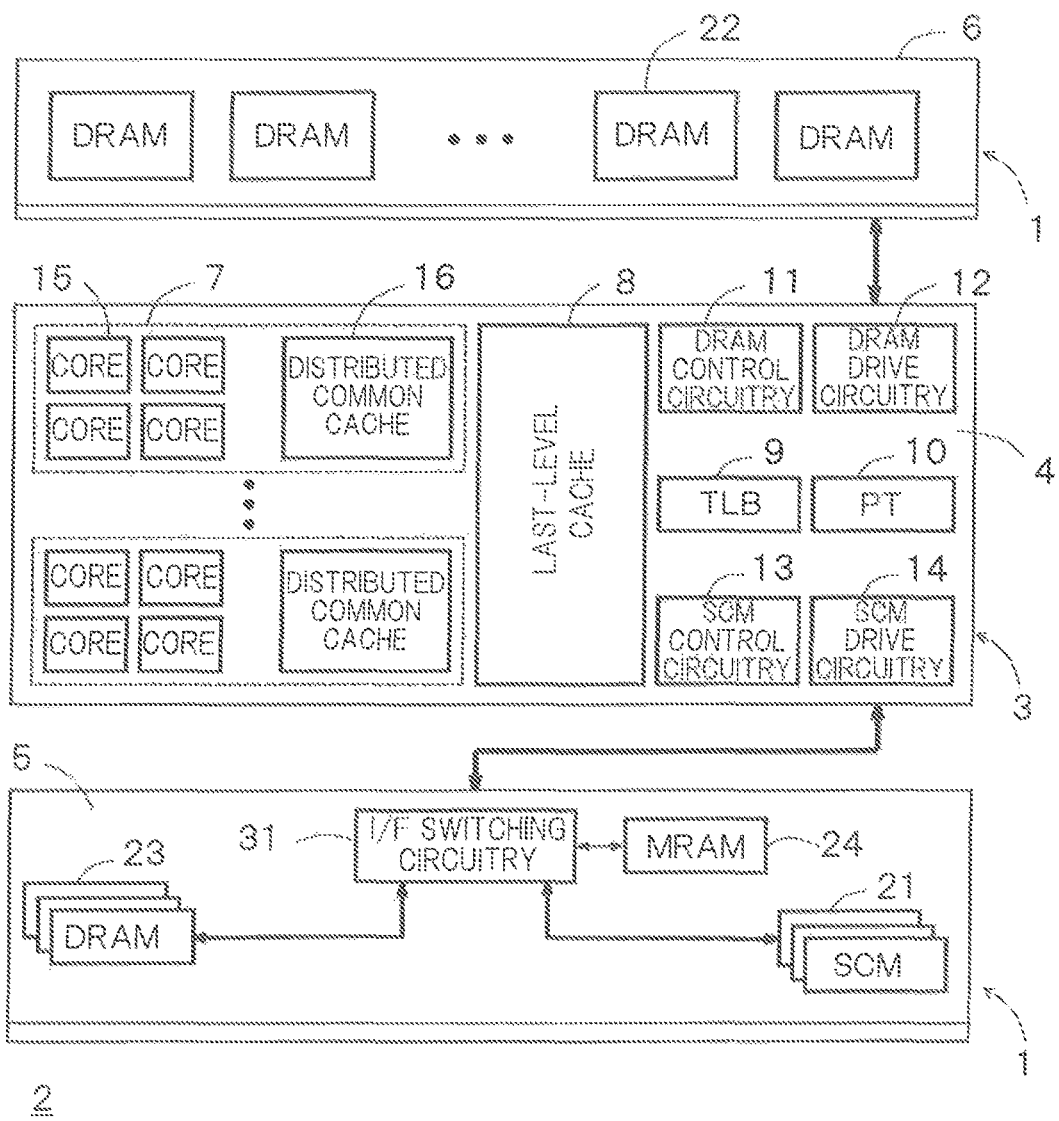
FIG. 3 is a block diagram schematically showing the configuration of a processor system according to a second embodiment.

FIG. 3 is a block diagram schematically showing the configuration of a processor system 2 according to a second embodiment. Part of the configuration of the second substrate 5 of the processor system 2 in FIG. 3 is different from that of FIG. 1. In FIG. 3, the same reference numerals are given to the components common with FIG. 1. In the following, explanation will be given mainly to the different points.

A second substrate 5 in the processor system 2 of FIG. 3 has a first memory 21, a second memory 23, a third memory 24, and I/F control circuitry 31. In other words, the second substrate 5 of FIG. 3 has a configuration in which the first control circuitry 25, the second control circuitry 26, and the I/F switching circuitry 27 on the second substrate 5 of FIG. 1 are replaced with the I/F control circuitry 31.

The example shown in the first embodiment is that the first memory (SCM) 21 and the second memory (DRAM) 23 both on the second substrate 5 are allocated in different address spaces of the processor 3. On the other hand, in the present embodiment, the second memory 23 is used as a cache memory of the first memory 21, and hence the second memory 23 is not allocated in the address space of the processor 3.

The third memory 24 on the second substrate 5 stores, not only the address conversion information the same as that in the first embodiment, but cache management information for using the second memory 23 as a cache memory of the first memory 21.

The I/F control circuitry 31 on the second substrate 5 controls access to the first memory 21 and the second memory 23 based on the address conversion information and the cache management information in the third memory 24. The cache management information includes the correspondence relationship between data stored in the second memory 23 and addresses, dirty flags, valid flags, etc.

The processor 3 determines whether to access the second substrate 5 having the first memory (SCM) 21 and the second memory (DRAM) 23, or the third substrate 6 having the fourth memory (DRAM) 22. When accessing the second substrate 5, the SCM control circuitry 13 instructs the I/F control circuitry 31 via the SCM drive circuitry 14 to access the second substrate 5. The I/F control circuitry 31 looks up the address conversion information and the cache management information in the third memory 24 to access either of the first memory (SCM) 21 and the second memory (DRAM) 23. When accessing the third substrate 6, the DRAM control circuitry 11 controls access to the fourth memory (DRAM) 22 via the DRAM drive circuitry 12.

Figure 4:
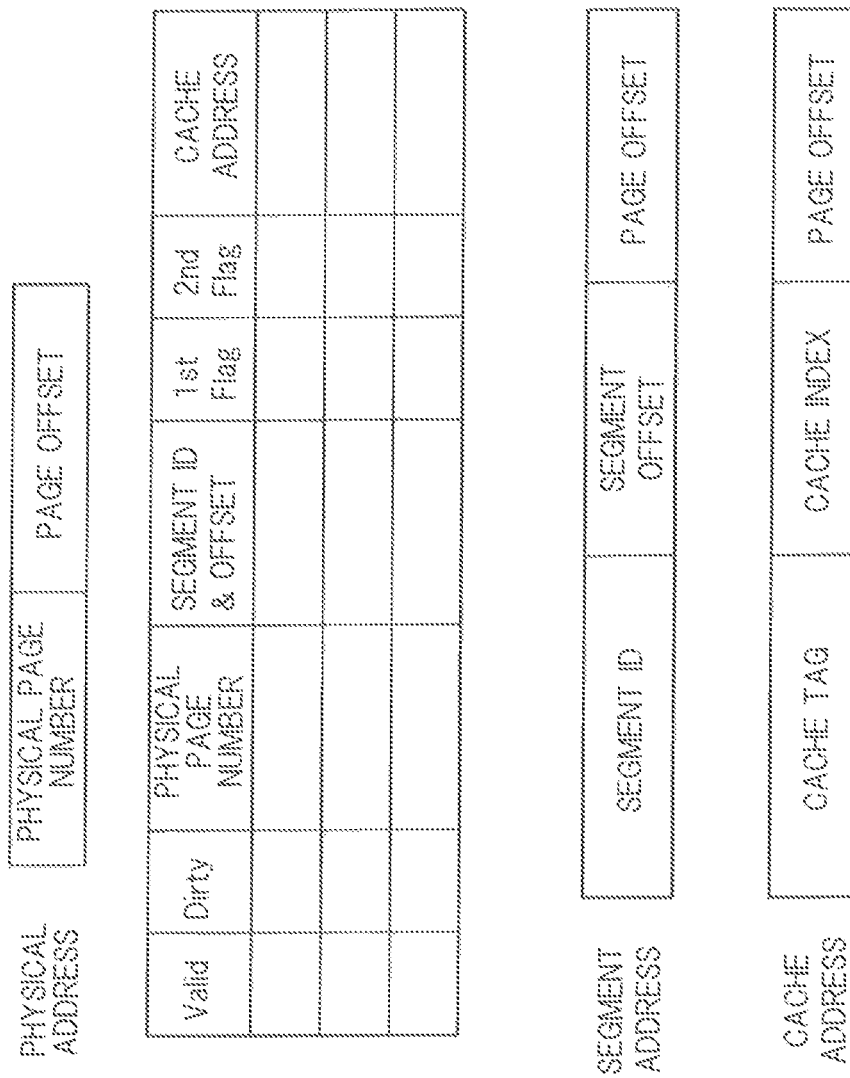
FIG. 4 is a diagram showing a data structure of a third memory.

FIG. 4 is a diagram showing a data structure of the third memory 24. The third memory 24 stores valid flag information, dirty flag information, physical page numbers (PPN), segment information, first flag information (1st Flag), second flag information (2nd Flag), and cache addresses, in association with one another. These information correspond to the address conversion information and the cache management information.

A physical address that is specified when the processor 3 makes an access request is configured by a physical page number and a page offset. An address of the first memory 21 is configured by a segment ID, a segment offset, and a page offset. A cache address is configured by a cache tag, a, cache index, and a page offset.

The valid flag information is information that indicates whether the corresponding data is valid or not. The dirty flag information is information that indicates whether the corresponding data in the second memory 23 has been written back to the first memory 21.

The first flag information is information that indicates whether each data in the first memory 21 is also present in the second memory 23. The second flag information is lockdown information that indicates whether to allow ejection of each data in the second memory 23. In addition, flag information that indicates whether each data in the second memory 23 is LRU (Least Recently Used) data or not may be provided.

As described above, the third memory 24 stores the address conversion information and the cache management information for accessing the first memory 21 and the second memory 23. Therefore, by looking up the third memory 24, the I/F control circuitry 31 can perform access control to the first memory 21 and the second memory 23, so that the configuration on the second substrate 5 can be simplified than that of FIG. 1.

Figure 5:
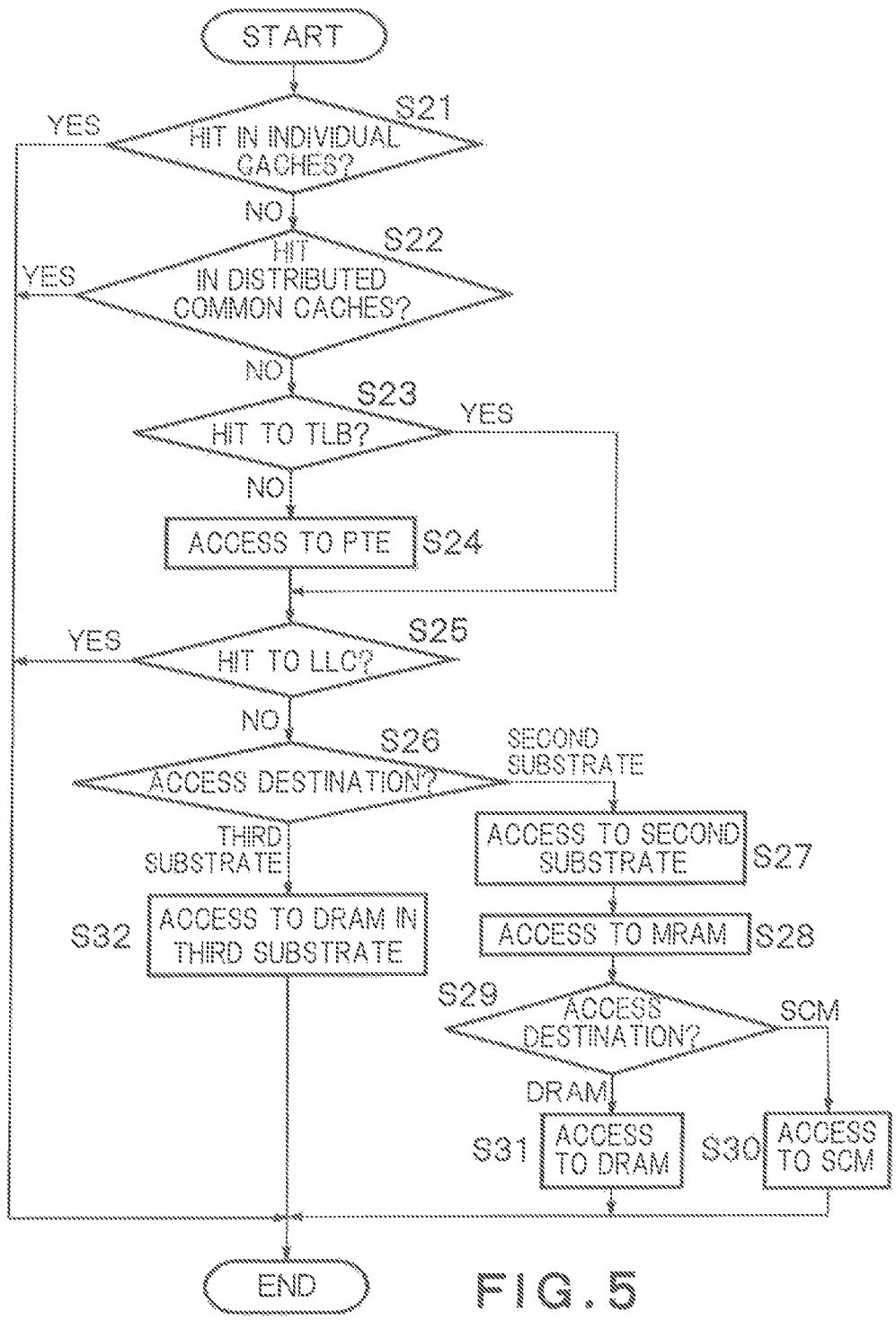
FIG. 5 is a flowchart showing an operation of the processor system according to the second embodiment.

FIG. 5 is a flowchart showing an operation of the processor system 2 according to the second embodiment. Steps S21 to S27 are the same as steps S1 to S7 of FIG. 2. After accessing the second substrate 5 in step S27, access is made to the third memory (MRAM) 24 (step S28). The cache management information in the third memory 24 is looked up to identify a page address in accordance with an access request of the processor 3 to determine whether to access the first memory 21 or the second memory 23 (step S29). If it is determined to access the first memory 21, access is made to the first memory (SCM) 21 (step S30). If it is determined to access the second memory 23, access is made to the second memory (DRAM) 23 (step S31).

If it is determined in step S26 to access the third substrate 6, in the same manner as in step S12 of FIG. 2, access is made to the fourth memory (DRAM) 22 in the third substrate 6 and the process of FIG. 5 ends (step S32).

As described above, in the second embodiment, since the second memory (DRAM) 23 is used as a cache memory of the first memory (SCM) 21 on the second substrate 5, access to the second substrate 5 is made at a higher speed. Therefore, even though the low-speed first memory (SCM) 21 is mounted on the second substrate 5, by using the high-speed second memory (DRAM) 23 as a cache memory, the disadvantage of the SCM 21 can be compensated. Therefore, without lowering the accessibility, the main memory can be configured with volatile and non-volatile memories.

Third Embodiment

Figure 6:
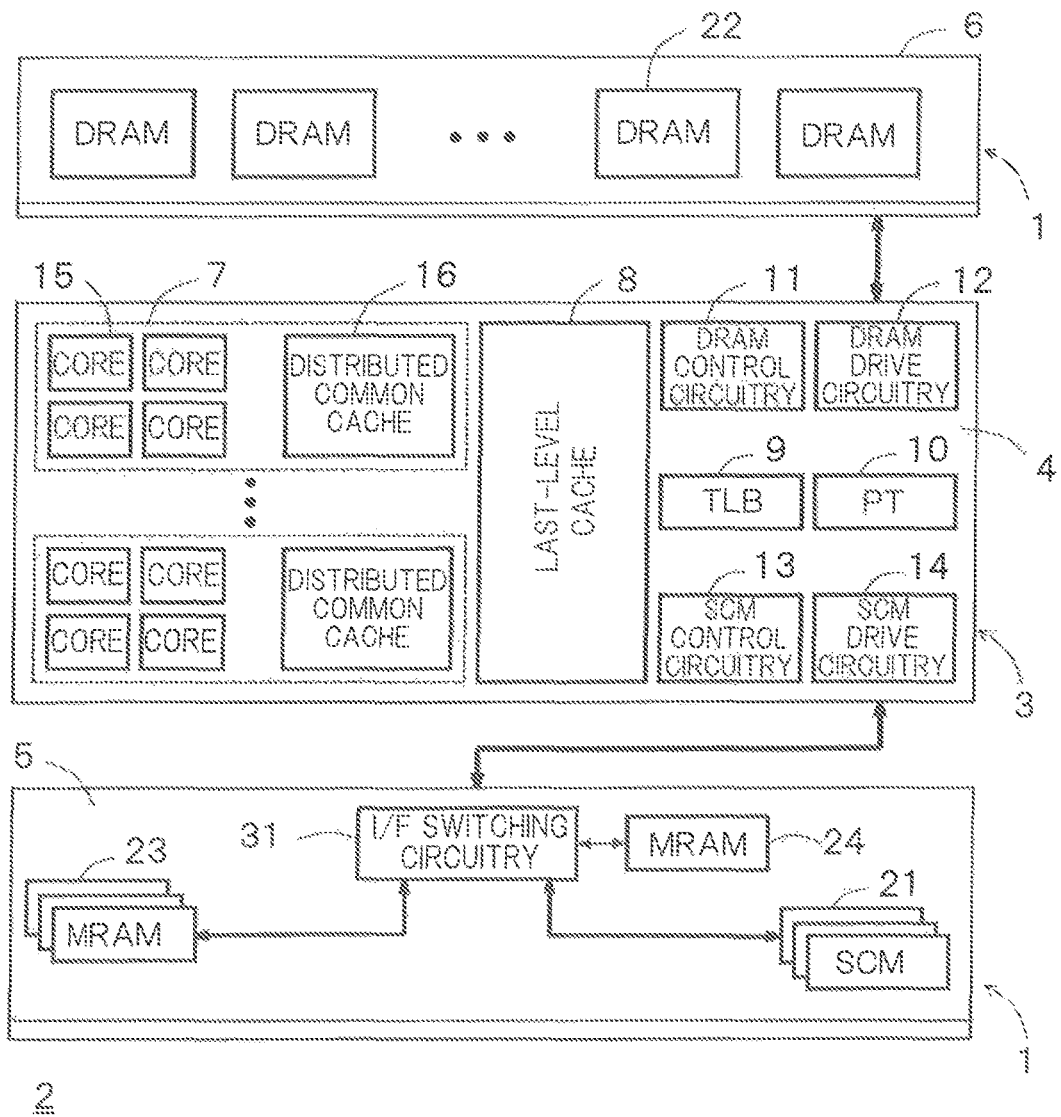
FIG. 6 is a block diagram schematically showing the configuration of a processor system according to a third embodiment.

FIG. 6 is a block diagram schematically showing the configuration of a processor system 2 according to a third embodiment. In the processor system 2 of FIG. 6, the second memory 23 in the second substrate 5 is configured with an MRAM instead of the DRAM 22, the other configuration being the same as that of FIG. 3.

Since the second memory 23 has a smaller memory capacity than the first memory 21, if the second memory 23 is configured with a non-volatile memory, it is highly possible that the second memory 23 is accessible at a higher speed than the first memory 21 that is also configured with a non-volatile memory. Moreover, the MRAM has a feature of higher access speed than non-volatile memories other than the MRAM. Therefore, by configuring the second memory 23 with the MRAM and the first memory 21 with, for example, a non-volatile memory other than the MRAM, the access speed of the second memory 23 can be made significantly higher than that of the first memory 21. Accordingly, the access speed can be improved when the second memory 23 is utilized as a cache memory of the first memory 21.

The example explained in the second embodiment is that the second memory 23 is configured with a volatile memory such as the DRAM 22. However, when the second memory 23 is configured with the volatile memory, in the case of power off, system reset, etc., a process of saving all valid data stored in the second memory 23 into the first memory 21 is required, so that the process speed is lowered. When the second memory 23 is configured with the non-volatile memory, even if power is off, since data is not erased, data save is not required, so that high process speed is achieved.

Figure 7:
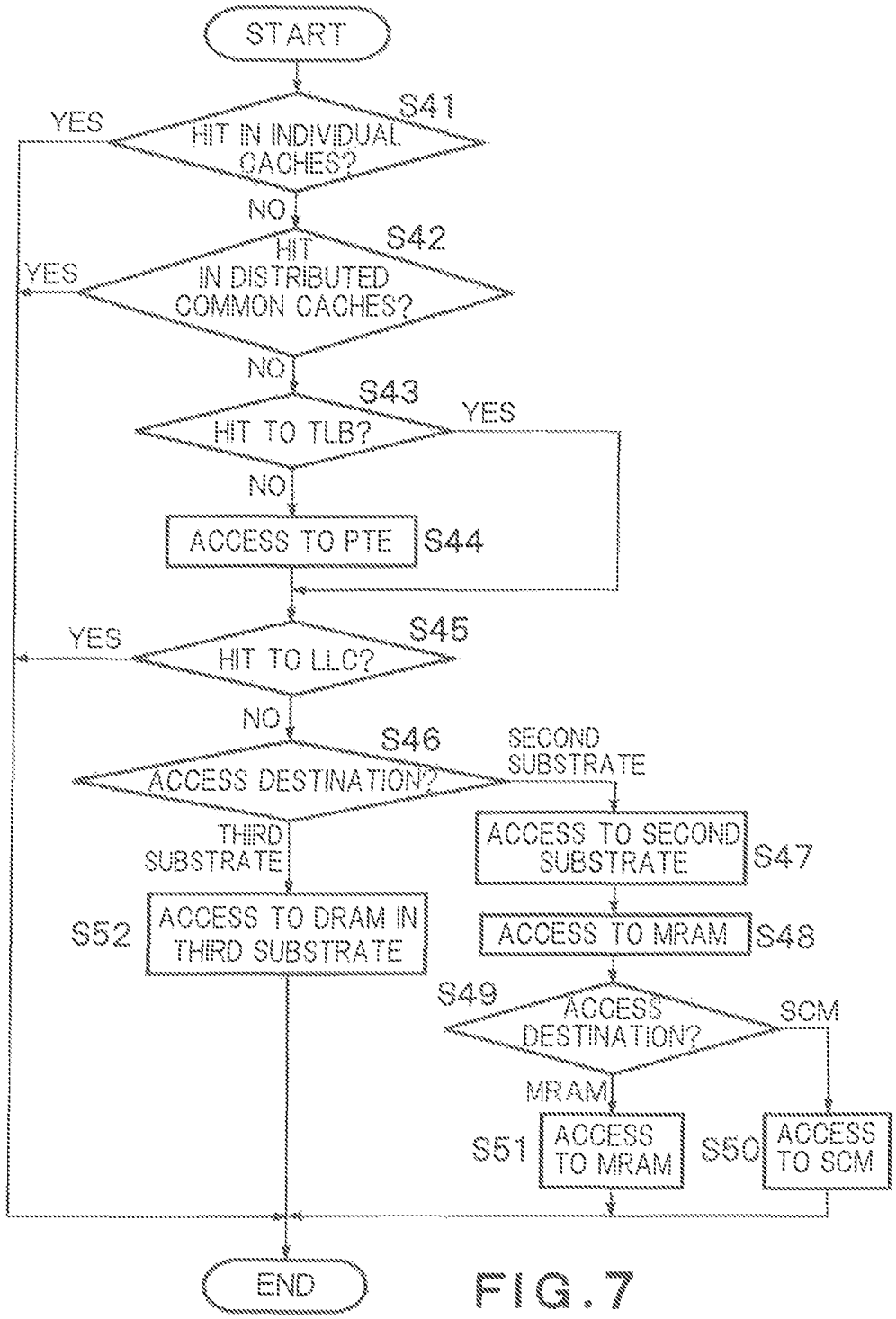
FIG. 7 is a flowchart showing an operation of the processor system according to the third embodiment.

FIG. 7 is a flowchart showing an operation of the processor system 2 according to the third embodiment. Except for step S51 different from step S31 of FIG. 5, the process of FIG. 7 is the same as that of FIG. 5. In step S51, if it is determined to access the second memory 23 on the second substrate 5, access is made to the MRAM that is the second memory 23.

As described above, in the third embodiment, the second memory 23, which is used as a cache memory on the second substrate 5, is configured with the MRAM. Therefore, access can be made to the second memory 23 at a higher speed than to the first memory 21, with no necessity of saving data of the second memory 23 at power off or the like, so that access control to the second memory 23 is made easier.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A memory system comprising:
a first memory to be accessed per first data size by a processor;
a second memory to be accessed per second data size smaller than the first data size by the processor, the second memory being accessible at a higher speed than the first memory;
a third memory to store address conversion information that converts an address for accessing the second memory into an address for accessing the first memory;
a fourth memory to be accessed by the processor with addresses different from addresses of the first memory;
a first substrate on which the first memory, the second memory and the third memory are mounted; and
a second substrate on which the fourth memory is mounted,
wherein the first and third memories are non-volatile memories,
the fourth memory is a volatile memory, and
the first memory and the fourth memory are included in a main memory to which an address space of the processor is allocated.

2. The memory system of claim 1 further comprising:
interface switching circuitry to switch access between whether to access the first memory or the second memory in response to an access request from a processor;
first control circuitry to control access to the first memory based on the address conversion information; and
second control circuitry to control access to the second memory.

3. The memory system of claim 1, wherein the second memory has a higher access priority than the first memory, and the second memory stores data stored in the first memory or stores data to be stored in the first memory,
wherein the third memory stores, in addition to the address conversion information, cache management information using the second memory as a cache memory of the first memory.

4. The memory system of claim 3, wherein the cache management information comprises first flag information indicating whether the data stored in the first memory is also present in the second memory.

5. The memory system of claim 4, wherein the cache management information comprises second flag information indicating whether to allow ejection of data stored in the second memory.

6. The memory system of claim 4 further comprising interface control circuitry to control access to the first and second memories based on the address conversion information and the cache management information, in response to an access request from a processor.

7. The memory system of claim 1, wherein the third memory has a smaller memory capacity than the first memory and is accessible at a higher speed than the first memory.

8. The memory system of claim 1, wherein the second memory is a volatile memory.

9. The memory system of claim 1, wherein the second memory is a non-volatile memory.

10. The memory system of claim 9, wherein the second memory is a non-volatile memory having a memory cell structure different from the first memory.

11. The memory system of claim 1, wherein the third memory is an MRAM (Magnetoresistive Random Access Memory).

12. A processor system comprising:
a processor; and
a memory system accessed by the processor,
wherein the memory system comprises:
a first memory to be accessed per first data size;
a second memory to be accessed per second data size smaller than the first data size, the second memory being accessible at a higher speed than the first memory;
a third memory to store address conversion information that converts an address for accessing the second memory into an address for accessing the first memory;

a fourth memory to be accessed by the processor with addresses different from addresses of the first memory;

a first substrate on which the first memory, the second memory and the third memory are mounted; and a second substrate on which the fourth memory is mounted, wherein the first and third memories are non-volatile memories, the fourth memory is a volatile memory, and the first memory and the fourth memory are included in a main memory to which an address space of the processor is allocated.

13. The processor system of claim 12 further comprising:

interface switching circuitry to switch access between whether to access the first memory or the second memory in response to an access request from a processor;

first control circuitry to control access to the first memory based on the address conversion information; and second control circuitry to control access to the second memory.

14. The processor system of claim 12, wherein the second memory has a higher access priority than the first memory, and the second memory stores data stored in the first memory or stores data to be stored in the first memory, wherein the third memory stores, in addition to the address conversion information, cache management information using the second memory as a cache memory of the first memory.

15. The processor system of claim 14, wherein the cache management information comprises first flag information indicating whether the data stored in the first memory is also present in the second memory.

16. The processor system of claim 15, wherein the cache management information comprises second flag information indicating whether to allow ejection of data stored in the second memory.

17. The processor system of claim 15 further comprising interface control circuitry to control access to the first and second memories based on the address conversion information and the cache management information, in response to an access request from a processor.

18. The processor system of claim 12, wherein the third memory has a smaller memory capacity than the first memory and is accessible at a higher speed than the first memory.

19. The processor system of claim 12, wherein the second memory is a volatile memory.

20. The memory system of claim 11, wherein the first memory is a Phase Change Random Access Memory.

21. The memory system of claim 11, wherein the first memory is a Resistance Random Access Memory.

* * * * *

UNITED STATES PATENT AND TRADEMARK OFFICE
CERTIFICATE OF CORRECTION

PATENT NO.        : 10,423,536 B2
APPLICATION NO.   : 15/455483
DATED             : September 24, 2019
INVENTOR(S)       : Hiroki Noguchi et al.

It is certified that error appears in the above-identified patent and that said Letters Patent is hereby corrected as shown below:

On the Title Page

Item (73), the Assignee's city of residence is incorrect. Item (73) should read:
-- (73) Assignee: TOSHIBA MEMORY CORPORATION, Tokyo (JP) --

Signed and Sealed this
Seventh Day of July, 2020

Andrei Iancu
*Director of the United States Patent and Trademark Office*